April 25, 1961 V. FAMILIER 2,981,902

AUTOMATIC IMPEDANCE MATCHING DEVICE

Filed June 22, 1959 3 Sheets-Sheet 1

INVENTOR
VLADIMIR FAMILIER

By
Wenderoth, Lind & Ponack
Attys.

April 25, 1961 V. FAMILIER 2,981,902

AUTOMATIC IMPEDANCE MATCHING DEVICE

Filed June 22, 1959 3 Sheets-Sheet 2

INVENTOR
VLADIMIR FAMILIER

By
Wenderoth, Lind & Ponack
Attys.

April 25, 1961 V. FAMILIER 2,981,902

AUTOMATIC IMPEDANCE MATCHING DEVICE

Filed June 22, 1959 3 Sheets-Sheet 3

INVENTOR

VLADIMIR FAMILIER

By

Wenderoth, Lind & Ponack

Attys.

2,981,902

AUTOMATIC IMPEDANCE MATCHING DEVICE

Vladimir Familier, Sevran, France, assignor to Telecommunications Radioelectriques et Telephoniques, T.R.T. (Societe Anonyme), Paris, France Filed June 22, 1959, Ser. No. 821,749

Claims priority, application France June 23, 1958

4 Claims. (Cl. 333—17)

The present invention relates to a device for automatically tuning an impedance network in such a way as to match its impedance to a load which may vary within very wide limits. It is suitable, for example, for an automatic matching network at the output of a power amplifier feeding an antenna. In what follows we shall for the sake of simplicity refer more particularly to this specific example, since the requisite transformation of the impedance presented by an aerial, over a wide range of frequencies, into a pure resistance equal to the characteristic impedance of a feeder constitutes the typical problem, and the most difficult to solve, which is here under consideration. Nevertheless it will be understood that the invention is not restricted to this case and that it may be applied to numerous other cases, for example, to that of matching an impedance to the load resistance of a power amplifier.

Reverting then to the automatic matching of an antenna to the output of a transmitter, we are aware of, for example, the American patent U.S. 2,742,618 of 29th December 1951, in which the antenna is connected to earth through a circuit comprising in series two variable impedances whose variation is controlled by motors. The output of the amplifier feeds the second impedance, in this case a self-inductive winding, through a tapping by way of a phase detector and of an amplitude comparator in series. Each of the latter components actuates one of the said motors. The total range of frequencies to which the antenna can be tuned is nevertheless limited by the smallness of the number of parameters available.

We are also aware of automatic tuning systems such as that described in the applicant's French specification No. 1,145,191 of 15th November 1955, in which when the system is effecting an adjustment, it puts itself first in the zero position of the tuning scale. This arrangement is resumed in the present invention on account of the advantages which it procures for avoiding tuning to a harmonic, without mentioning other original arrangements which will appear in what follows.

The object of the invention is particularly to render the said arrangement such that it will satisfy the various practical requirements better than in the past and notably will permit of automatic adjustment over a very wide range, and that whatever may be the sub-range automatically commuted.

It consists principally, in a device of the kind in question, in inserting into the tuning network at least one commutable element, the operation of which makes it possible to set up two different circuits in the structure of the network, the tuning being effected first with a first predetermined circuit, and then, if the latter does not admit of matching the impedance of the load, the said commutable element comes into operation and the tuning is effected with the second said circuit.

It consists, apart from this principal arrangement, of various other arrangements which may be used separately or preferably in conjunction and of which further particulars will be given hereinafter, and particularly in a second arrangement using a mixed discriminator of modulus and phase comprising in combination a part common to the discrimination of the modulus and of the phase and constituted by a current transformer fed in series with the current which is to be discriminated, and furnishing a voltage V1 to its secondary winding; together with a circuit fed in shunt and furnishing voltages V2 and V3 in opposition to one another, these voltages V1, V2, V3 being combined in known manner in circuits which constitute a phase-discriminator, while a capacitive voltage-divider fed in shunt furnishes a voltage V4 equal to V1 when the modulus of the input impedance has a predetermined value, the voltages V1 and V4 feeding in opposition a comparator device which constitutes a modulus-discriminator.

It contemplates certain methods of construction and application (notably in transmitters functioning automatically), and, as new industrial products, in devices entailing the application of the above-mentioned arrangements, and in the components and the special tools used in setting them up, and also the assemblages, whether fixed or movable, which embody such devices.

Without thereby restricting the invention we shall now more particularly explain the latter with reference to the accompanying drawings, in which.

Figure 1:
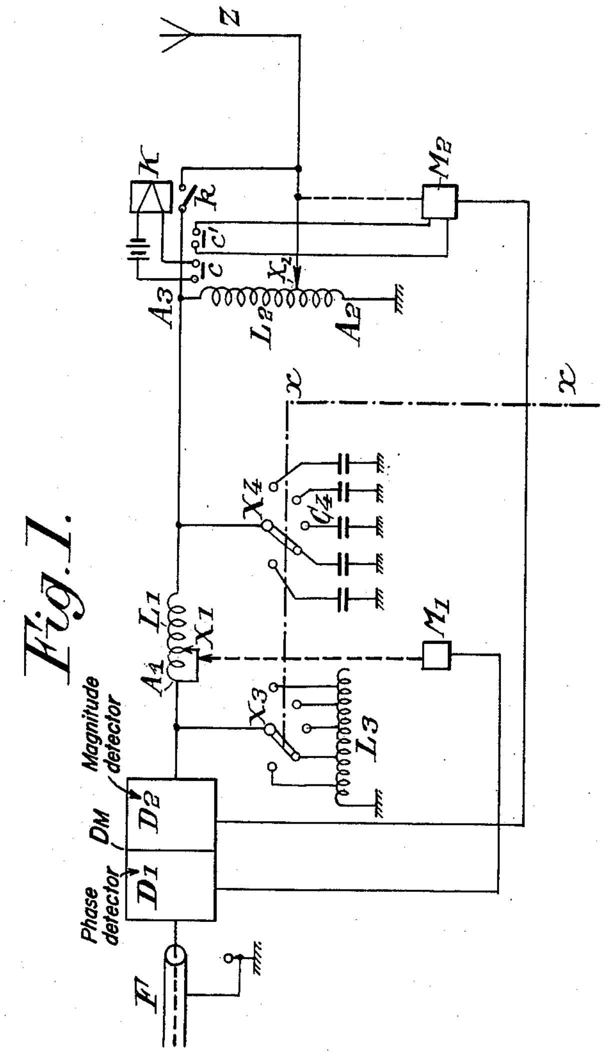
Figure 1 shows a matching device for an antenna constructed in accordance with the invention.

The device according to the invention represented in Figure 1 is designed to match the antenna Z, whose impedance may vary between very wide limits, to a feeder F whose characteristic resistance $R_f$ is equal to 50 ohms. The operation of this device is entirely automatic; that is to say that when the excitation frequency of the pilot signal is changed, whatever may be the sub-range, the variable elements in the network will vary under the influence of suitable control means, until the tuning has been completely effected. It is assumed also that the different tunable components of the transmitter tune themselves automatically, for example in the manner described in specification 1,155,539 of the 2nd December 1957 (filed in France).

For each sub-range are provided commutable elements such as the tappings on the winding L3 and on the condenser C4, which are selected by an automatic commutating arrangement individual to the sub-range, such as one of those described in specification 1,155,540 of 4th July 1956, or the additions thereto, and which shifts the commutators X3, X4 through the actuating means *x*—*x*. The tuning thus effected is only approximate and does not suffice to tune the network, which embodies for this purpose two variable components, namely the self-inductive windings L1, L2 with sliding tappings X1, X2 which are displaceable by means of corresponding motors M1, M2, under the control of discriminators D1, D2 respectively.

The network comprises four components, of which one, L1, is in series to earth and the others, L2, L3, C4 are in shunt to earth. It is interposed between the feeder F and the antenna Z in cascade with the two discriminators D1, D2, these being adjacent to the feeder. The discriminators D1, D2, may be grouped in one mixed discriminator as generally indicated at $D_m$ and as described in detail hereunder with reference to Fig. 5. The zero position of the tapping X1 is marked A1 in Figure 1 and the tapping X1 itself is so connected electrically as to short-circuit the dead end, while a contact *k* of a relay K may break a short-circuit which is otherwise set up by a connection between the tapping X2 and that end A3 of the winding L2 which is opposite to the earthed end A2.

Figure 2:
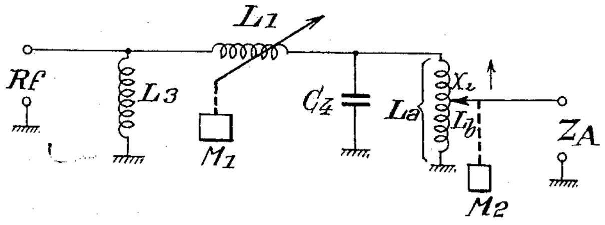
Figure 2 is a schematic diagram of the said device in the first phase of its operation.
Figure 3:
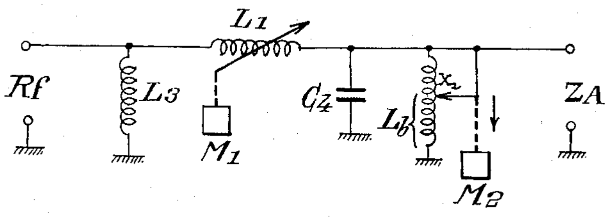
Figure 3 is a schematic diagram in the second phase of the operation.

The result is that according as relay K is or is not energized, the network can operate in accordance with one or other of the two possible circuits which are shown respectively in simplified form in Figures 2 and 3.

The discriminator D1 is a phase-discriminator, a component well known in itself, providing a voltage whose polarity depends on the sign of the phase-difference between the current and the voltage in the lead connected to the feeder F and which disappears when this phase-difference passes through zero.

The discriminator D2 is a modulus-discriminator providing a voltage whose polarity varies according as the ratio of the load impedance of the feeder to the characteristic impedance of the latter (50 ohms in the present instance) is greater or less than unity, and which disappears when the load impedance is equal to the characteristic impedance.

The device according to the invention functions in the following manner:

As soon as the pilot signal changes, the sliders X1, X2 return respectively to the positions A1, A2 which correspond to the maximum of the self-inductance of the winding L1 and to zero coupling with the winding L2 which constitutes an auto-transformer; at the same time the motors M1, M2 begin to operate. This is effected preferably by means wholly similar to those described in specification 1,155,539 already referred to.

The circuit of the network corresponds therefore at first to Figure 2 (contact *k* open). The oscillatory circuit formed by L1, L3 and C4 with the whole of L2 in shunt, that is to say *La*, is tuned. This tuning is effected by varying the inductance L1 under the control of the discriminator D1. In this phase of the adjustment, variation of the inductance L1 takes place from the maximum towards the minimum, which makes impossible any tuning to the harmonics of the operating frequency.

The modulus-discriminator D2 intervenes equally and simultaneously to control the movement of the motor M2. The adjustment corresponds to the progressive load of the oscillatory circuit, the progress being due to the rising movement of the slider X2. The arrest of this movement takes place at a value of the coupling such that the input impedance, in the present example, is 50 ohms. The displacement of the slider X2 being controlled by the modulus-discriminator D2, the stabilization of the argument to a value zero is assured by the simultaneous action of the phase-discriminator D1 on the motor M1 which controls the slider X1.

If, however, the impedance of the antenna is such that the adjustment of the modulus cannot be effected by varying the coupling of the auto-transformer L1, the slider X2, at the end of its travel, closes a contact *c*. This closes the circuit of the relay K, which is energized and is held on by a suitable circuit, not shown. The circuit shown in Figure 3 is then set up and a second contact *c'* reverses the direction of rotation of the motor M2. A second phase of the adjustment then follows, with movement of the slider X2 in a direction opposite to the preceding direction (descending movement as shown in the drawing) until tuning has been effected.

Figure 4:
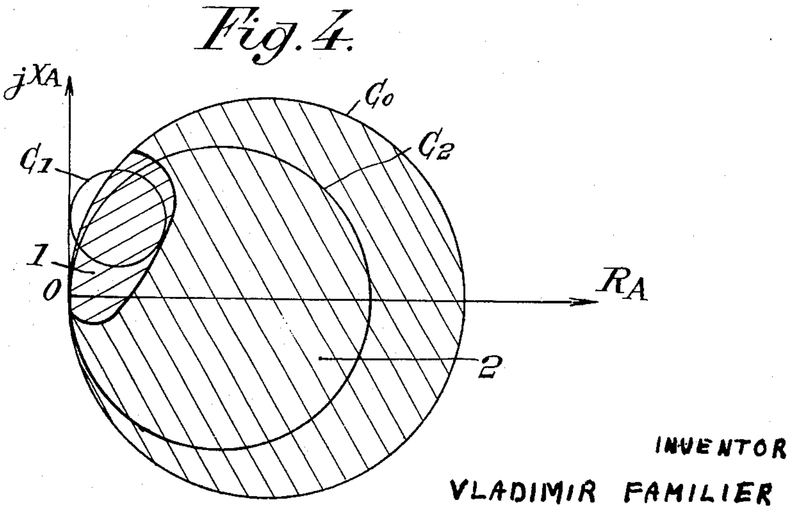
Figure 4 is a corresponding set of graphs.

A similar result would be obtained, in accordance with the invention, by providing that the contact *c* be directly connected in place of the contact *k*, the relay K and intermediate electric circuit being omitted, if the contact *k* be provided with a mechanical holding means. The possible variation of the output impedance (between X2 and earth) may be understood by referring to Figure 4, which is drawn in the complex plane. On the abscissa axis is shown the pure resistance $R_A$ of the complex output impedance $Z_A$, and on the ordinate axis is shown the imaginary reactance $jX_A$. It will be seen that under these conditions, during the first phase of the adjustment the point representing the impedance *Za* describes substantially a circumference such as C1 when L1 varies, if the slider X2 is fixed (*Lb* constant); when X2 is displaced this circumference is displaced, changing its magnitude, with the result that the representative point sweeps the hatched zone 1.

The co-ordinates of the centre of the circumference C1, corresponding to the position X2 at A3, are approximately $X_p^2/80$ and $X_p$, where $X_p$ is the reactance of the components $L_a$ and $C_4$ in parallel.

In the second phase, on the other hand, if X2 is caused to vary one similarly obtains for each value of $L_1$ circumferences such as C2, and the family of these circumferences makes it possible to describe the hatched zone 2. In practice the whole matching area of the possible impedance of the antenna is contained inside the circumference *Co*, which is the curve obtained in this second phase, when the value of L1 is fixed at its maximum value (X1 at A1) while X2 varies. In a practical example the order of magnitude of the diameter of *Co* was between $10^4$ and $10^6$ ohms.

Figure 5:
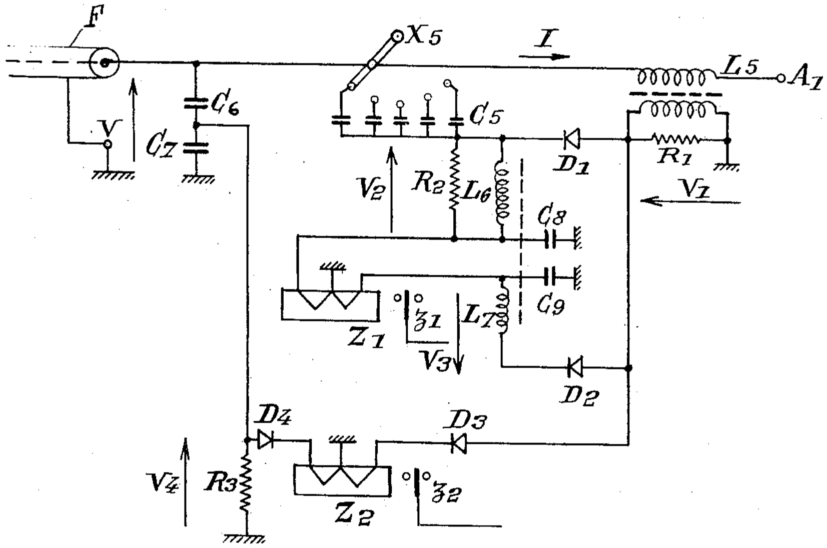
Figure 5 shows an example of a mixed discriminator of modulus and phase which may be used in the invention.

Figure 5 shows by way of example, but without restrictive effect, how it is possible to construct a mixed discriminator for both modulus and phase, combining the components D1 and D2, which may be used as shown at $D_m$ in Fig. 1.

This discriminator is mixed in the sense that it embodies a part which is common to the component for discriminating phase and that for discriminating modulus. This common part is constituted by a current-transformer L5 which supplies at the terminals of its secondary winding, across a low resistance R1, a voltage V1 which is substantially in phase with the current I flowing through the primary of the transformer L5. The latter is connected to the output of the feeder F in series with the winding L1, Figure 1.

The part of the arrangement shown in Figure 2 which functions as a phase-discriminator comprises, in addition to the said common part, the circuit constituted by the condenser C5 in series with the resistance R2, to the terminals of which is connected a self-inductive winding L6 closely coupled to L7. This circuit is connected at one end, namely the wiper of the condenser C5, to the feeder F and at the other end by way of a condenser C8 to earth. The voltages V2 and V3 at the terminals of the windings L6 and L7 are practically equal and opposite and in quadrature with the voltage V1.

The vectorial combinations of the voltages V1 and V2 on one hand and V1 and V3 on the other are set up, in consequence of the connections with the diodes D1, D2, in the respective two windings of a differential relay Z1, and it will be seen that in this way there has been constructed a phase-discriminator whose predominant voltage, acting on the relay Z1, causes the contact *z*1 to move in one direction or the other, enabling the corresponding motor to be driven (see also Figure 1).

It may be pointed out here that the condenser C5 varies, according to the sub-range, in response to a commutation symbolized by X5. The capacitors are chosen in such a way as to bring about tuning between C5, L6 and R2, the voltage V2 having to be, in the middle of each sub-range, in quadrature with the voltage V at the output of the feeder. The commutation is effected at the same time as that of the commutators X3 and X4 (Figure 1) and by the same means.

As regards that part of the arrangement shown in Figure 5 which functions as a modulus-discriminator: this comprises essentially, in addition to the above-mentioned common part, a capacitive voltage-divider with two condensers C6, C7, connected between the feeder and earth. At the common point of these two condensers is also connected a high resistance R3, the other end of which is earthed, and this makes it possible to take a voltage V4 from its terminals.

The capacitive voltage-divider is adjusted, in accordance with L5, in such a way that $V4=V1$ when the modulus of the input impedance has the desired value (50 ohms). As before, these two voltages are compared by means of connections through diodes D4, D3 in the two corresponding windings of a relay Z2 which through its contact $z2$ controls the corresponding motor M2.

Naturally the control of the motors by the contacts $z1$, $z2$ may be exercised either directly or through an amplifying stage.

The invention is not restricted to the practical example above illustrate and/or described and includes all modifications. In the particular case in which the impedance $Z_A$ is that of the load resistance of a power amplifier, the winding L3 may be replaced by a condenser.

What I claim is:

1. In and for an impedance matching network interposed between a circuit output and the grounded load of said circuit and having a grounded inductance coil connected to its output and provided with an adjustable tap connected with the ungrounded terminal of said load, impedance ratio detecting means serially connected between said circuit output and the input of said network and having an output voltage responsive to the position of said tap and reversible motor means responsive to said output voltage to continuously move said adjustable tap along said inductance as long as said output voltage is not nil, the combination comprising means to initially set said adjustable tap at the grounded end of said inductance and automatically start said motor means to cause displacement of said adjustable tap in the direction leading towards the ungrounded end of said inductance coil, to thereby vary said output voltage towards zero, switching means effective for connecting said adjustable tap to said ungrounded end and for reversing the direction of action of said motor means on said tap, to thereby further vary said output voltage towards zero upon said tap reaching said inductance coil ungrounded end.

2. The combination according to claim 1, wherein said switching means include a first end-of-stroke switch and a second end-of-stroke switch, both said switches being operatively associated with said adjustable tap to be actuated as the latter reaches its ungrounded end, means to connect said ungrounded end to said adjustable tap in response to actuation of said first switch and means to reverse the direction of action of said motor means on said adjustable tap in response to actuation of said second switch.

3. The combination according to claim 1, wherein said impedance matching network further comprises a second inductance coil serially connected between said network input and the ungrounded end of said grounded inductance coil, an adjustable tap on said second inductance coil, connected with one terminal thereof, phase-detecting means having an output voltage responsive to the position of said tap, second motor means additional to said reversible motor means and responsive to said output voltage to continuously move said tap away from said terminal until said output voltage becomes nil, and means to initially set said tap on said terminal and automatically start said second motor means.

4. The combination according to claim 3, further comprising a current transformer of which the primary is serially connected between said circuit output and network input, wherein said phase-detecting means comprise a first detector serially connected in a circuit including the secondary of said transformer, a first grounded relay coil, means for supplying a first voltage 90° out of phase on the voltage of said output, a second detector serially connected in a circuit including said secondary, a second grounded relay coil and means for supplying a second voltage opposite to said first voltage, said first and second relay coils being arranged for closing a first control circuit when the current in said first detector is greater than the current in said second detector, and for closing a second control circuit in the opposite case, wherein said impedance ratio detecting means comprise a third detector serially connected in a circuit including said secondary, a third grounded relay coil, a fourth detector fed with a voltage proportional to the voltage of said output and serially connected with a fourth grounded relay coil, said third and fourth coils being arranged for closing a third control circuit when the current in said third detector is greater than the current in said fourth detector, and for closing a fourth control circuit in the opposite case, and wherein said second motor means is fed through one of said first or second control circuit while said reversible motor means is fed through one of said third or fourth control circuit.

References Cited in the file of this patent

UNITED STATES PATENTS 2,122,183 Schwarzer ------------- June 28, 1938

FOREIGN PATENTS 785,838 Great Britain ----------- Nov. 6, 1957